H. W. SCHMIDT.
SPRING VEHICLE WHEEL.
APPLICATION FILED FEB. 12, 1910.

973,569.

Patented Oct. 25, 1910.

Witnesses
O. B. Baenziger
J. G. Howlett

Inventor
Henry W. Schmidt
by
E. J. Wheeler
Attorney

UNITED STATES PATENT OFFICE.

HENRY W. SCHMIDT, OF DETROIT, MICHIGAN.

SPRING VEHICLE-WHEEL.

973,569.  Specification of Letters Patent.  Patented Oct. 25, 1910.

Application filed February 12, 1910. Serial No. 543,553.

*To all whom it may concern:*

Be it known that I, HENRY W. SCHMIDT, a citizen of the United States, residing at Detroit, in the county of Wayne, State of Michigan, have invented certain new and useful Improvements in Spring Vehicle-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to spring wheels for vehicles, more expressly designed for use on automobiles, and consists in the construction and arrangement of parts hereinafter more fully set forth and pointed out particularly in the claim.

The object of the invention is to produce a spring wheel of comparatively simple and inexpensive construction, wherein the arrangement is such as to provide for resiliently mounting the hub within the rim of the wheel in a manner to absorb the shock incident to the passage of the wheel over a rough surface and prevent transmission of the shock to the axle of the vehicle.

The above object is attained by the structure illustrated in the accompanying drawings, in which:—

Figure 1:
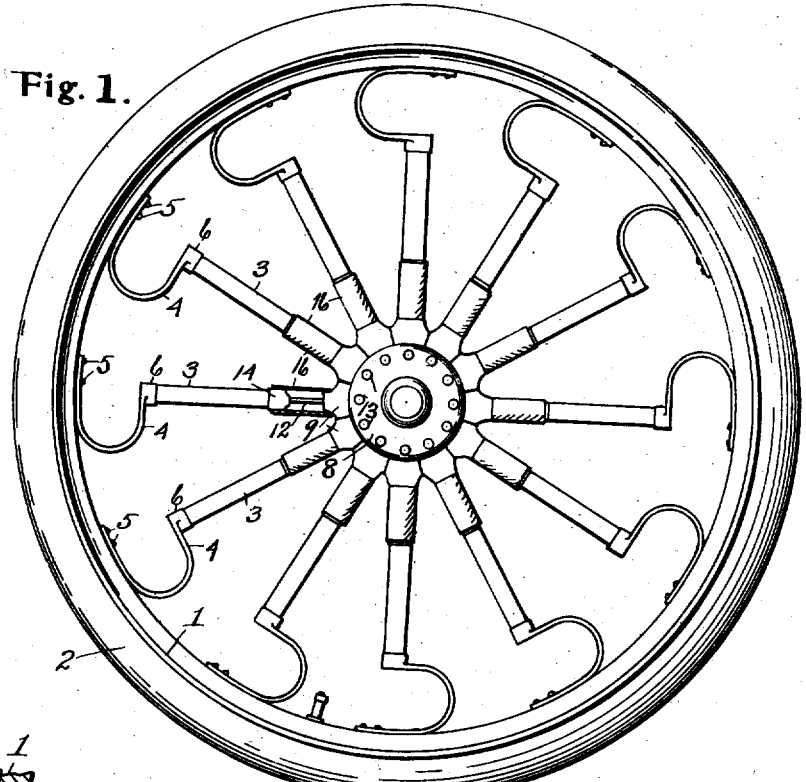
Figure 2:
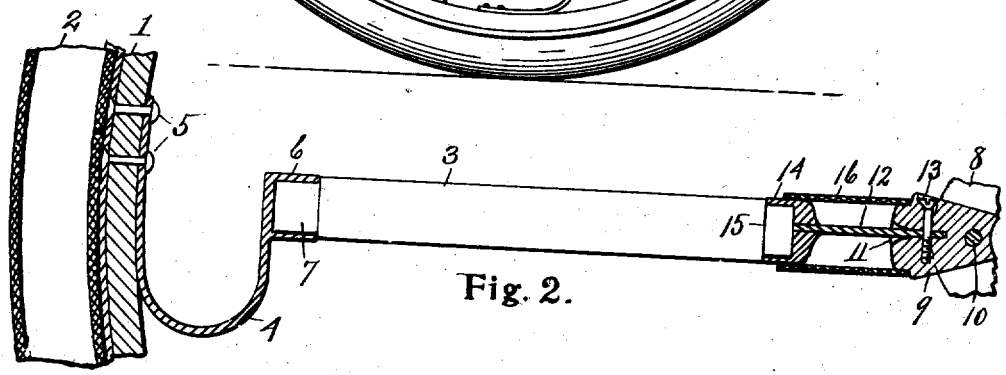
Figure 3:
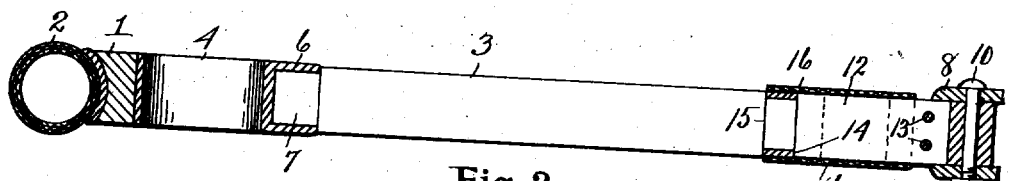

Figure 1 is an elevation of a wheel made in accordance with my invention, one of the flexible tubular coverings over the flat springs which connect the inner ends of the spokes to the hub members, being in section. Fig. 2 is an enlarged fragmentary view in section through a portion of the rim and one of the U-shaped springs mounted thereon with which the outer ends of the spokes are connected, and through the spring and connecting parts through the medium of which the inner ends of the spokes are connected with the hub of the wheel. Fig. 3 is a sectional view at right angles to Fig. 2.

Referring to the characters of reference, 1 designates the rim of the wheel which may be of any suitable construction, and which is provided with a suitable tire 2. The tire illustrated in the drawings is of the pneumatic type, but a solid tire may be employed, if desired.

The major portion of the spokes 3 is formed preferably of wood. Interposed between the outer end of each of the spokes and the rim of the wheel is a U-shaped spring 4 formed preferably of flat spring steel. The outer end of each of said springs is suitably secured to the rim of the wheel, as shown at 5, and the inner end thereof is provided with a socket member 6, said socket members being adapted to receive the tenons 7 on the outer ends of the spokes, thereby effecting a rigid connection between the spokes and springs 4.

The hub 8 may be of any suitable construction and is provided with hub members 9 which are fitted between the side plates of the hub and secured by the transverse bolts 10. In each of said hub members is formed a flaring slot 11 (see Fig. 2), in which is secured the inner end of a straight flat spring 12 by means of screw bolts 13. The opposite end of each of the flat springs 12 is cast, or otherwise rigidly secured in a socket member 14 adapted to receive a tenon 15 on the inner end of each of the spokes 3. By this arrangement, the outer ends of the wooden spokes are flexibly connected with the rim through the medium of the U-shaped springs 4 and the inner ends of said spokes are flexibly connected with the hub through the medium of the flat springs 12. The springs 12 are so disposed as to suspend the hub flexibly within the wheel with respect to the diameter thereof, but hold said hub rigidly in place with respect to lateral displacement. When the wheel encounters an obstruction the rim rises vertically, the springs 4 upon the lower side contracting, and said springs on the upper side of the wheel expanding, while the flat springs 12 on opposite sides of the vertical center of the wheel, bend laterally to accommodate the vertical displacement of the rim. Because of this yielding connection between the spokes and rim, and the flexible suspension of the hub within the spokes, the shock incident to the encountering of an obstruction by the tire is absorbed very largely in the wheel and is transmitted only in a minor degree to the axle.

For the purpose of covering and protecting the flat springs 12, a piece of flexible tubing 16 is placed around each of said springs to extend from the hub member 9 onto the socket member 14, thereby inclosing each of said springs in a flexible case, as clearly shown in the drawings, which does not detract from the resiliency of the springs 12.

Having thus fully set forth my invention, what I claim as new and desire to secure by Letters Patent, is:—

A wheel comprising a rim, a hub, relatively short rigid spokes, curved springs interposed between the outer ends of said spokes and the rim of the wheel, and relatively short springs interposed between the inner ends of the spokes and the hub and rigidly connected to both to flexibly connect the inner ends of said spokes with the hub of the wheel.

In testimony whereof, I sign this specification in the presence of two witnesses.

HENRY W. SCHMIDT.

Witnesses:
STUART SIMMONS,
I. G. HOWLETT.